Nov. 28, 1939.  J. P. WALKER  2,181,684

EMULSION TREATING APPARATUS

Original Filed March 29, 1935   3 Sheets-Sheet 1

Inventor
JAY P. WALKER

By

Attorney

Nov. 28, 1939.   J. P. WALKER   2,181,684
EMULSION TREATING APPARATUS
Original Filed March 29, 1935   3 Sheets-Sheet 3
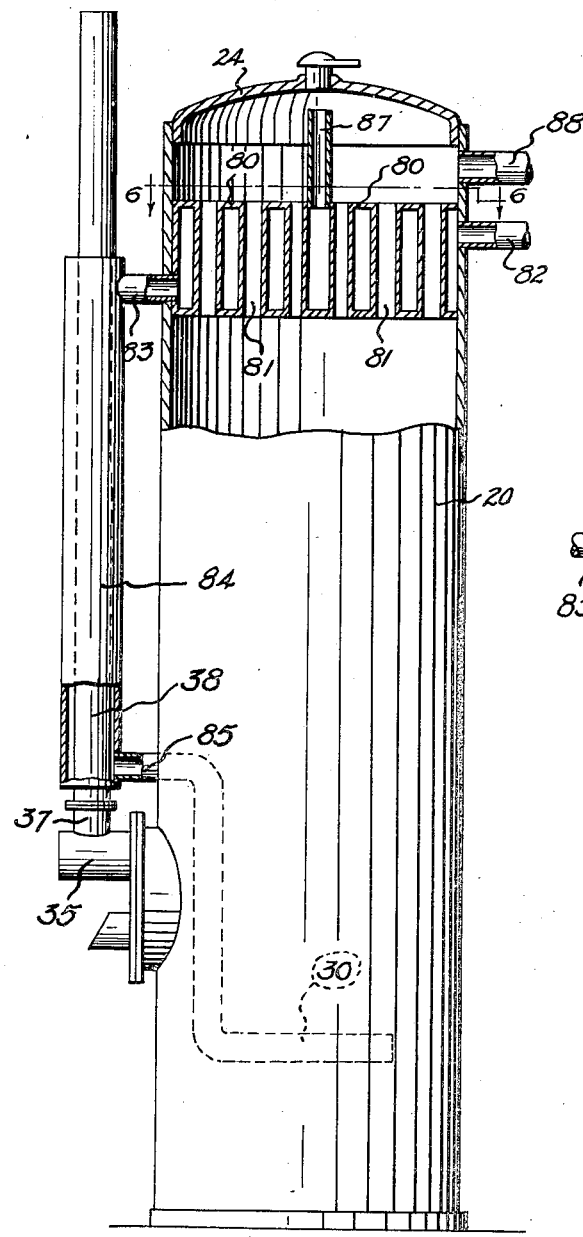
Fig. 5
Fig. 6
Inventor
JAY P. WALKER
By 
Attorney Patented Nov. 28, 1939

2,181,684

UNITED STATES PATENT OFFICE 2,181,684

EMULSION TREATING APPARATUS

Jay P. Walker, Tulsa, Okla., assignor of forty per cent to Guy O. Marchant and six per cent to C. G. Wells, both of Tulsa, Okla.

Original application March 29, 1935, Serial No. 13,675. Divided and this application September 12, 1936, Serial No. 100,575

10 Claims. (Cl. 183—2.7)

This invention relates to new and useful improvements in emulsion treating apparatus.

This application is filed as a division of my co-pending application, filed March 29, 1935, Serial Number 13,675.

One object of the invention is to provide an improved emulsion treating apparatus for handling or treating any grade of emulsions with minimum losses of the desirable gaseous fluids.

An important object of the invention is to provide an improved emulsion treating apparatus for preheating the influent before it is conducted to the heating unit, wherein the heated oil within the tank may be utilized to preheat the influent by a heat exchange.

A further object of the invention is to provide means within the upper end of the treating tank around which the hot oil circulates, and means for passing the influent into said means, whereby the comparatively cool influent is heated and the hot oil cooled.

Still another object of the invention is to provide a drum structure within the upper end of a treating tank into which the influent is delivered to be pre-heated, said structure permitting a portion of the gas to be scrubbed from the influent and means for conducting the separated gas from the drum.

A construction designed to carry out the invention will be hereinafter described, together with other features of the invention.

Figure 1:
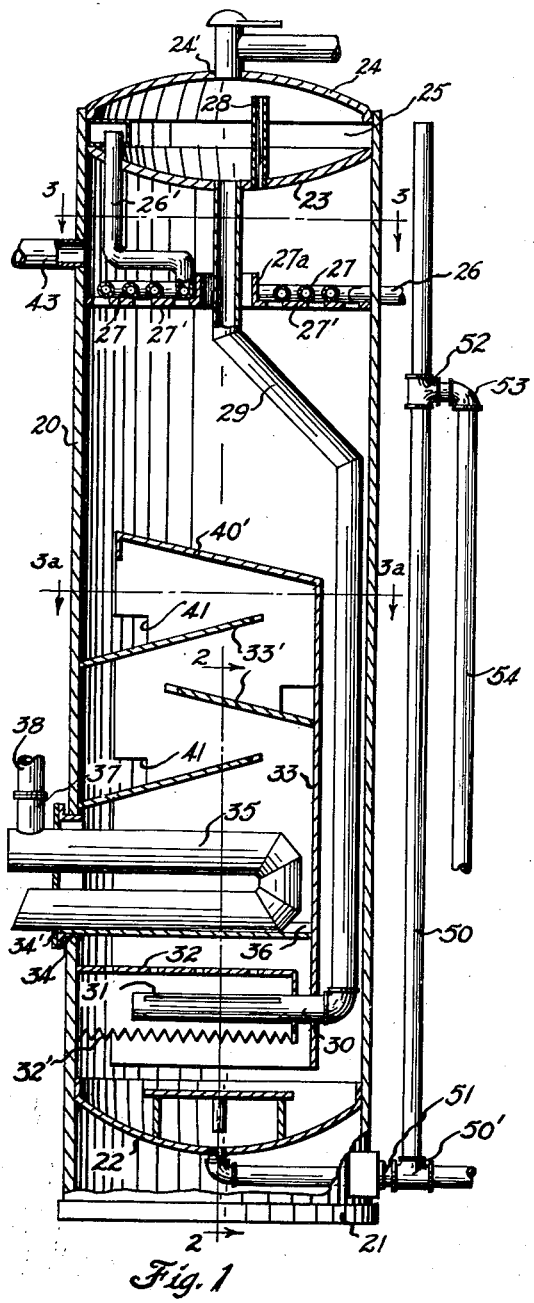
Figure 3A:
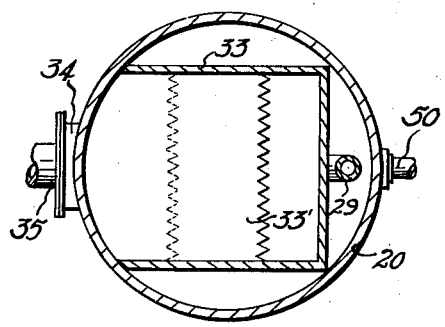
Figure 3:
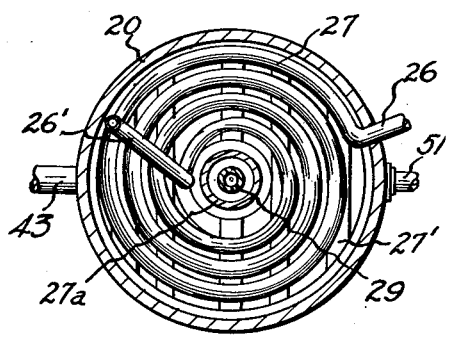
Figure 4:
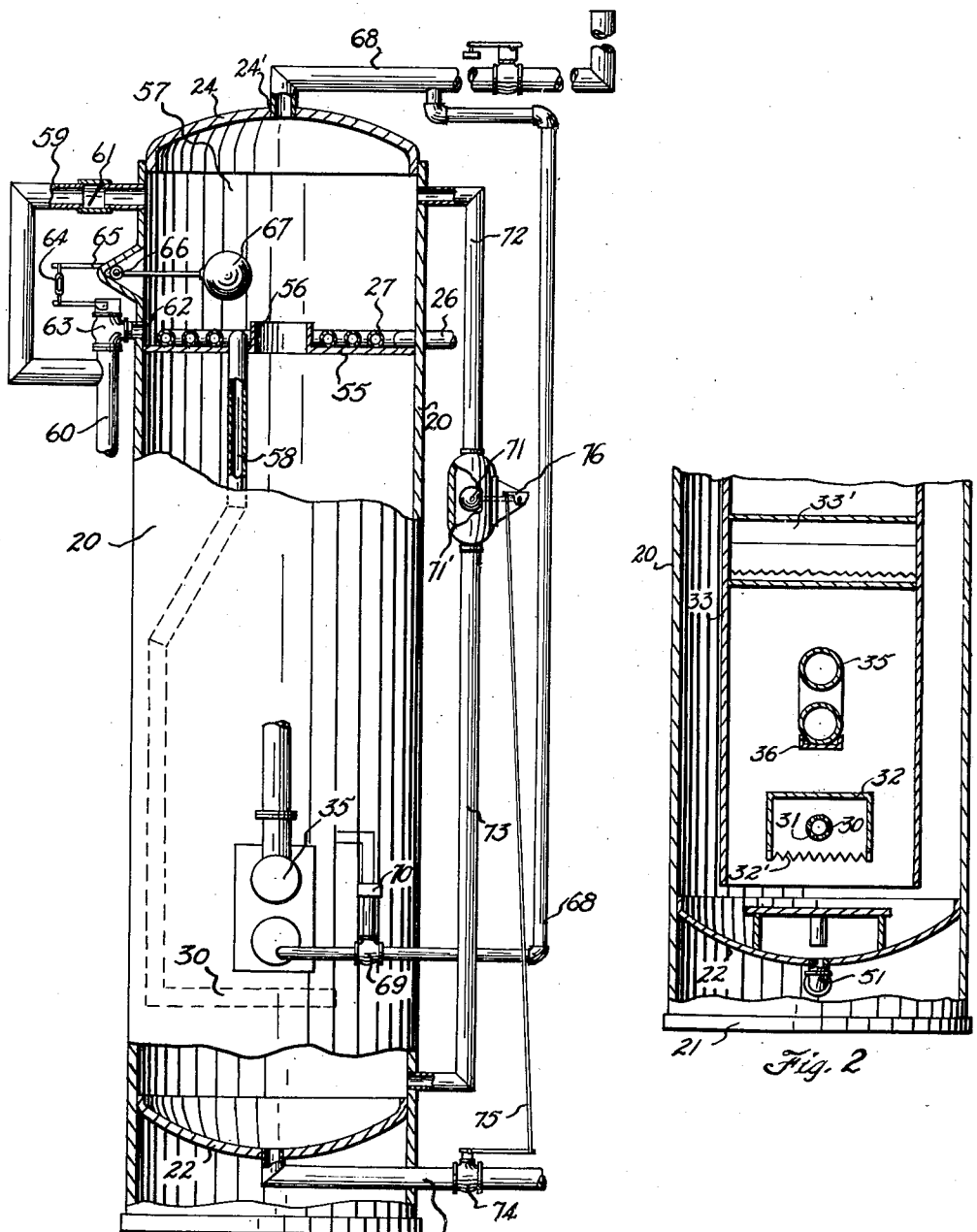

The invention will be more readily understood from a reading of the following specification and by reference to the accompanying drawings, in which an example of the invention is shown, and wherein:

Figure 1 is a view, partly in elevation and partly in section of an apparatus, constructed in accordance with the invention, Figure 2 is a transverse, vertical, sectional view, taken on the line 2—2 of Figure 1, Figure 3 is a horizontal, cross-sectional view, taken on the line 3—3 of Figure 1, Figure 3a is a horizontal, cross-sectional view, taken on the line 3a—3a of Figure 1, Figure 4 is a view, partly in section and partly in elevation of a modified form of the invention, Figure 5 is a view, partly in elevation and partly in section, showing still another form of the invention, and Figure 6 is a horizontal, cross-sectional view, taken on the line 6—6 of Figure 5.

In the drawings, the numeral 20 designates an upright cylindrical tank of the usual construction, such as is used in the building of separators. The tank is provided with a suitable base 21 and a false bottom 22. A dished head 23 is secured within the tank near the upper end thereof, while the extreme upper end of said tank is closed by a crowned cap or top 24. The members 23 and 24 seal off the upper portion of the tank, and as is obvious by observing Figure 1, are spaced from each other so as to form a primary separating chamber 25 therebetween.

An inlet pipe 26 enters the tank 20 at a point below the head 23 and this pipe discharges into a coil 27 which is disposed laterally across the tank below said head. The coil is mounted on a suitable frame 27' composed of cross bars attached to the tank wall. The frame has a central or axial collar 27a through which the oil in the lower end of the tank may flow. The influent is conducted from the coil 27 through an upright pipe 26' which discharges into a diverter box 25' located within the chamber 25, whereby the influent is caused to take a circumferential path around the inner wall of said chamber. The influent is scrubbed on the wall of the chamber 25, while the gaseous fluids which are separated rise therein. A suitable gas escape pipe may be connected in said top 24. A vertical stand pipe 28 is mounted in the head 23 and extends upwardly within the chamber 25. The pipe is located at one side of the head and has its upper end terminating just below the top 24, whereby a communication is established between the chamber 25 and the tank 20 below the head 23.

The liquids which have been primarily separated from the gas, but which contain some gas in solution, flow from the chamber 25 down an axial discharge pipe 29. The pipe 29 extends from the bottom of the head 23 and is offset so as to extend downwardly in close proximity to the wall of said tank. At its lower end the pipe 29 is connected to one end of a horizontal nozzle 30 which extends diametrically across the tank, as is best shown in Figure 1. The nozzle 30 has one or more elongated slots 31 therein and these slots may be located wherever desired. The mixture or emulsion composed of oil and water and substantially free from gas, is discharged from the nozzle into a receiving hood 32 which has a general rectangular shape. The hood extends from the wall of the tank inwardly so as to overhang the nozzle, and the flat top of the hood is preferably provided with perforations, while the lower edges of its vertical walls are formed with saw-teeth 32'.

The emulsion which is discharged into the hood from the nozzle will have a tendency to rise but it cannot escape except through the perforations in the hood or downwardly and around the saw-teeth edges 32'. The hood 32 acts as a spreader and causes the emulsions to flow more or less horizontally or laterally from the nozzle. Because of the degasification in the chamber 25 the emulsion discharged from the nozzle will flow more or less unagitated. The saw-teeth and the perforations break up the emulsion into numerous small streams and thereby reduce the surface tension of the oil.

An upright housing 33, which is closed on three vertical sides and which has its bottom open, is disposed in the lower part of the tank. The vertical edges along the open sides of the housing are attached to the inner wall of the tank 20, as is shown in Figure 3a. The hood 32 is contained within the lower portion of the housing a substantial distance above the open bottom thereof. The housing is provided with transverse inclined baffles 33' which are located in staggered relation and the arrangement or mounting of the housing 33 within the tank is the same as the thermo-syphon treating unit fully shown and described in my co-pending application filed March 29, 1935, Serial Number 13,675.

The tank 20 is provided with a manhole 34 which is located just above the hood 32, and a U-shaped tubular fire box 35 is mounted in the cover 34' of the manhole. The fire box extends into and across the tank within the housing 33 and it will be seen that by removing the manhole cover 34', said fire box may be bodily removed from the tank. The lower leg of the box is supported upon an angle bar 36 extending from the manhole to the opposite wall of the housing. This lower leg of the box is open and receives a suitable burner or heater, while the upper leg of said fire box is closed and carries a nipple 37 extending upwardly from the projecting end to which a suitable stack 38 may be attached. It is to be specifically noted that the invention is not to be limited to any particular kind of heat or heating element, as any suitable means for heating may be employed.

Under operating conditions, the water level within the tank 20 will stand some distance above the top of the housing 33, while the oil level will stand some distance above the water level. It is to be understood that the water level may, if desired, be below the top of the housing and any suitable means may be employed for controlling this water level. Therefore, it will be seen that the water standing within the tank 20 will be heated by the heater 35, and the emulsion which is discharged from the nozzle 31 will comingle with the body of heated water as it flows upwardly in the housing 33.

In order to control the water level in the tank 20, an adjustable stand pipe 50 is employed. This pipe is connected with a T 50', which in turn, is connected in the water discharge pipe 51 which leads from the bottom 22 of the tank. The T is arranged to rotate whereby the stand pipe may be swung. The outer end of the pipe 51 is plugged so that water will rise in the stand pipe 50 to the same level as in the tank 20. A T 52 is connected in the pipe 50 and an elbow 53 attaches said T with a downwardly extending discharge pipe 54. The water in the pipe 50 will be higher than in the tank 20, due to the additional weight of the oil floating on the water. It will be seen that by swinging the pipe 50, the elbow 53 will be raised or lowered and thus, the water level in the tank controlled. It is noted that any other controlling means may be used.

The action or operation is exactly the same as that of the treating unit disclosed in my co-pending application hereinbefore referred to. The upwardly flowing emulsion passing through the zone of the fire box 35 in the housing 33 will be properly heated and will then encounter the transverse inclined baffles 33' and as the emulsion passes upwardly through the housing, the water will be precipitated. Apertures or openings 41 are provided in the vertical side wall of the housing just above each baffle and nearer the lower ends. These openings permit water which is separated from the emulsion to run down the upper side of the baffle and escape from the housing. By the time the emulsion reaches the upper end of the housing and escapes into the tank from beneath the inclined top 40' of said housing, substantially all of the water will be separated therefrom and the upwardly flowing stream will be practically all oil with some gas in solution.

Due to the arrangement of the housing and baffles, a thermo-syphon action will be set up whereby circulation of water will be provided down through the vertical passages on each side of the housing 33 and upwardly within said housing. This recirculating of the water aids in heating the influent discharged from the nozzle 31, thus requiring less heat to be supplied by the fire box. Further, the heated water passing downwardly around the housing and within the tank tends to insulate, by heat exchange, the fluids and liquids being heated within the housing 33, against the temperatures outside of the tank.

After the emulsion has travelled through the housing 33, it will finally escape from beneath the inclined top 40' of said housing and into the upper end of the tank 20. By the time the emulsion has reached this point, the water has been precipitated therefrom and the separated oil may then escape through an outlet pipe 43 which is provided in the wall of the tank at a point between the coil 27 and the head 23. Thus, the hot oil must pass upwardly around the coil 27 through which the influent is introduced, into the oil chamber formed between the frame 27' and the head 23. Since the influent is comparatively cool, while the oil is heated, it will be obvious that a heat exchange will occur, whereby the oil is cooled and the influent heated. This preheating of the influent makes for easier separation of the gas from the emulsion in the chamber 25, and also reduces the amount of chemical necessary to dehydrate the influent, as well as reducing the heat of the firebox in the treating operation.

It is noted that the spacing of the oil outlet pipe 43 at some distance below the head is important. The location of this outlet is such that a space is provided between the oil level in the tank and the bottom of the head 23, whereby the gases rising from the hot oil may flow upwardly into this space so as to contact the bottom of the head 23. This causes condensation of the higher volatiles in the hot gas and these volatiles are thus dropped into the oil to raise the specific gravity thereof. A portion of the hot gases rise through the stand pipe 28 and contact the comparatively cool gases in the chamber 25, whereby the liquid content of these hot gases is dropped into the liquid influent in the chamber 25. Thus, the hot gases are condensed and distilled as liquids, and these liquids such as gasoline, are remixed with the oil whereby the gravity of the oil is built up to substantially its original gravity. This eliminates the escape or passing off of the more volatile gases, such as gasoline, and also restores the oil to approximately its original specific gravity whereby the treating process has not effect on the condition or grade of the oil.

In Figure 4, I have shown a slightly modified form of the invention. In this form, the influent enters the tank through the inlet pipe 26 and discharges into the coil 27. This coil is supported on a transverse partition 55 which is provided with an axial collar 56, whereby the oil beneath the partition may flow upwardly into the upper end of the tank. It is noted that the dished head 23 is eliminated in this form and, therefore, instead of the chamber 25 a chamber 57 is formed between the top 24 of the tank 20 and the partition 55. The opposite end of the coil 27, instead of being directed into the chamber 25, as in Figure 1, is extended downwardly through connection with a vertical pipe 58. This pipe is similar to the discharge pipe 29 in Figure 1 and has its lower end connected with the nozzle 30.

A gas by-pass pipe 59 leads from the chamber 57 just below the top 24 and connects in an oil discharge pipe 60. This pipe includes a check valve 61 which prevents gas reversing its passage in the pipe 59. By means of the by-pass pipe a certain amount of gas is conducted from the chamber 57 and introduced into out-flowing hot oil to enrich the same. The influent in passing through the coil 27 is pre-heated and the hot oil which flows up through the collar 56 and covers the coil is thus cooled. The oil escapes through a pipe 62 to a valve 63. The valve 63 is in turn connected to the oil discharge pipe 60.

For controlling the outlet of oil through the pipe 60, the valve 63 is connected by suitable linkage 64 with an arm 65, which arm is mounted on a rocker shaft 66. The shaft 66 also carries a float 67 which is located within the chamber 57 above the coil 27. Thus, it will be seen that as the oil level within the chamber 57 varies, the float 67 will be raised and lowered to control the operation of the valve 63, thereby controlling the flow of the oil from the pipe 60.

A fuel pipe 68 extends from the opening 24' in the top 24 of the tank downwardly and exteriorly of the tank 20 and has its lower end connected to the burner within the firebox 35. In this way the gas which is separated from the emulsion and which rises to the top of the chamber 57 may be utilized to fire the burner and thereby eliminate the necessity of supplying auxiliary fuel. In order to properly operate the burner with the separated gas, it is necessary to carry a pressure in the tank and chamber. A gas valve 69 is connected in the pipe 68 and this valve is controlled by an ordinary thermostat 70 which is mounted on the tank in the usual way. No claim is made for this thermostat, because automatic control of fuel burners is quite common in the separator art. In the above arrangement, fuel is supplied by the separator and it is unnecessary to obtain an auxiliary source of fuel supply although if desired, such could be done.

A float 71 is disposed at one side of the tank 20 at the height at which it is desired to carry the water level within said tank. The upper end of the float chamber 71' is connected with the chamber 57 by a pipe 72, while the lower end of said float chamber is connected with the lower end of the tank 20 just above the false bottom 22 by a pipe 73. The water will rise in the pipe 73 and operate the float 71 as the water level raises and lowers in the tank 20.

The water outlet pipe 51 which leads from the bottom 22 of the tank is provided with an outlet valve 74 and this valve is connected in the usual way by an elongate rod 75 with a lever 76, which lever is operated by the float, as is common in this art. It is to be understood that this form of water control may be interchanged with the stand pipe 50 and thus, either form may be used. It is desirable to use the float mechanism disclosed in Figure 4 when the gas from the seperator is used to fire the burner in such case it is necessary to carry a pressure in the tank and chamber.

In Figures 5 and 6, I have shown still another form of the invention wherein the chamber 25 is entirely eliminated and a pre-heating and cooling drum 80 is mounted in the upper end of the tank 20 in place of the coil 27 as shown in Figures 1 and 4. This drum extends transversely of the tank and is provided with upright tubes 81 which extend therethrough. It is noted that the upper end of the drum is spaced some distance from the crowned top 24 of the tank, whereby a gas space and oil chamber is provided therebetween. The vertical tubes 81 permit the hot oil which rises from the lower portion of the seperator and floats on top of the water, to pass upwardly therethrough. The influent in passing through the drum and contacting with the tubes is preheated while the oil is cooled by said influent.

An influent pipe 82 enters the upper portion of the drum while a discharge pipe 83 leads from the lower and opposite side of said drum. The stack 38 extends from the nipple 37 of the firebox 35, for carrying off the waste products of combustion. A cylindrical jacket 84 surrounds this stack but is spaced therefrom so as to provide a passage for the downward flow of the oil and water mixture which enters the upper end of the jacket. The lower end of the jacket is connected to the nozzle 30 by a pipe 85 and this pipe may, if desired, have a hand-controlled valve (not shown) connected therein, whereby the flow to the nozzle may be controlled. The water extracting structure within the tank 20 may be the same as that shown in the other figures.

It is obvious that the influent enters the drum through the pipe 82 and as it passes around the vertical pipes 81, it is preheated. While passing through the drum, gas is separated from the influent and escapes from said drum through a vertical pipe 87 which extends axially from its upper end. This gas which is separated discharges into the space beneath the crowned top 24 of the tank 20. The top may have a pressure outlet valve mounted therein to control the escape of gas, whereby some gas is held in the chamber above the drum at all times. The heated oil and water mixture passes downwardly from the drum around the stack 38, flowing through the jacket 84 from where it is conducted to the nozzle 30 by the pipe 85. Therefore, in this type there are two stages of preheating. The hot oil which passes upwardly through the vertical tubes 81 escapes through the outlet 88 which is provided at the upper end of the tank 20. It is noted that the hot gases which arise from the hot oil also pass upwardly through the tubes 81 and contact the comparatively cool gases which have escaped from the drum 80, whereby the majority of these hot gases are condensed and recovered as liquids, after which they admix with the oil escaping from the outlet 88, whereby the specific gravity of said oil is built up.

From the above, it will be seen that in all the forms the preheating and cooling device is mounted within the upper end of the tank and is preferably made an integral part of said tank. In this manner the hot oil flowing upwardly in the tank may be employed to preheat the influent. At the same time that the influent is being heated, the hot oil is cooled. This cooling of the hot oil is especially desirable because it makes for more ready admixture of the condensates of the gases in the upper end of the tank with said oil. By locating the preheater and cooling device within the tank, it is obvious that the necessity of providing an auxiliary unit for this purpose is eliminated and the structure of the apparatus is simplified.

What I claim and desire to secure by Letters Patent, is:

1. An emulsion treating apparatus including, an upright tank, a preheating and cooling coil immersed in the upper transverse strata of the body of hot oil and horizontally mounted in the upper portion of the tank and having an influent inlet, an oil outlet extending from the tank above said coil, a valve in said outlet, a float in the tank above said coil for operating said valve and for maintaining an oil level above said coil, whereby the coil is heated by the hot oil to preheat the influent, means for conducting the influent from the coil to the bottom of the tank, means for heating the influent in the lower portion of the tank, and means in the lower portion of the tank for separating the oil from the water.

2. A separator including, an upright tank, a transverse drum extending horizontally across and occupying the major transverse area of the upper portion of the tank and having vertical oil passages extending therethrough, an influent conductor entering said drum, means for conducting liquids from the drum to the lower portion of the tank, means for conducting gas from said drum, means for heating the influent in the lower portion of the tank, means in the lower portion of the tank for separating the oil and water, and an oil outlet above said drum, whereby the hot oil is caused to pass through said drum to preheat the influent and to be cooled.

3. An emulsion treating apparatus including, an upright tank, a separating chamber at the upper end of the tank having a gas outlet, an oil chamber immediately below the separating chamber, a preheating coil immersed in the oil of the oil chamber, an outlet from the oil chamber above the coil, a conductor extending from the coil to the separating chamber, a liquid conductor extending from the separating chamber to the lower end of the tank, means in the tank for heating the liquids, and means for precipitating the water from the oil, whereby the heated oil passes upwardly and around the coil to the outlet thereabove.

4. An emulsion treating apparatus including, an upright tank, a horizontally extending preheating and cooling coil mounted in the upper portion of the tank and having an influent inlet, an oil outlet extending from the tank, a float in the tank above said coil for operating said valve and for maintaining an oil level above said coil, whereby the coil is immersed in the upper transverse strata of the body of hot oil and is heated by the hot oil to preheat the influent, means for conducting the influent from the coil to the bottom of the tank, means for heating the liquids conducted to the bottom of the tank, and means for precipitating the water therefrom.

5. An emulsion treating apparatus including, an upright tank, a horizontally extending preheating and cooling coil mounted in the upper portion of the tank and having an influent inlet, an oil outlet extending from the tank, a valve connected to said outlet, automatic means in the tank actuated by the fluid level for operating said valve and for maintaining an oil level above said coil, whereby the coil is immersed in the upper transverse strata of the body of hot oil and is heated by the hot oil to preheat the influent, means for conducting the influent from the coil to the bottom of the tank, means for heating the liquids conducted to the bottom of the tank, and means for precipitating the water therefrom.

6. A separator including, a tank, a partition in the upper portion of the tank defining a gas separating chamber, means extending across the tank below the partition defining an oil chamber and open for liquids to flow therethrough, an oil outlet in the oil chamber above said means, a preheating and cooling coil mounted in the oil chamber above said means and below the oil outlet and receiving the well influent, said coil being immersed in the oil, a discharge conductor leading from the coil to the gas separating chamber, a conductor extending from the gas separating chamber to the lower portion of the tank for discharging the preheated liquids thereinto, means for heating the liquids discharged into the lower portion of the tank, means in the lower portion of the tank for separating water from oil, and means for carrying off the separated water.

7. A separator including, an upright tank, a gas outlet in the top of the tank, a body of water in the tank, means for heating said body of water, an oil outlet at the upper end of the tank maintaining an oil level near the top of the tank, the tank having a gas chamber at its extreme upper end adjacent the oil level, a coiled preheating and cooling conductor extending horizontally across the upper portion of the tank just below the oil level, whereby said coiled conductor is immersed in the hottest zone of said oil, said coiled conductor having an inlet for an oil well emulsion mixture and an outlet, means for conducting the mixture from the outlet of said conductor free from admixture with the oil to the lower end of the body of water, the said preheating and cooling conductor being closely coiled to provide amplified and long extended heat exchange surface and carrying the relatively cool influent through a segregated and greatly prolonged travel path in the hottest zone of the heated oil to heat said influent by heat exchange and to liberate gas therein, and means for discharging water from the tank.

8. A separator including, an upright tank, a gas outlet in the top of the tank, a body of water in the lower portion of the tank, means for heating said body of water, an oil outlet at the upper end of the tank maintaining an oil level near the top of the tank, whereby a body of hot oil is floated upon the body of water, the tank having a gas chamber at its extreme upper end above the oil level, a preheating and cooling conductor extending horizontally across the upper end of the tank and having spaced preheating passages in close relation and segregated from the influent flowing through the conductor, the conductor being immersed in the upper transverse zone of the body of oil and occupying approximately the entire transverse area of said tank, whereby hot oil flowing upwardly after being washed in said body of water is divided and caused to flow in streams through the passages in the conductor, said conductor having an inlet for an emulsion influent and an outlet remote from said inlet, whereby the influent is caused to flow in an extended travel path between said passages so that it is heated and the upper zone of the oil body is cooled by heat exchange, means for conducting the preheated influent to the bottom of the body of water, and means for discharging water from said tank.

9. A separator including, an upright tank, a gas outlet in the top of the tank, a body of water in the lower portion of the tank, means for heating said body of water, an oil outlet at the upper end of the tank maintaining an oil level near the top of the tank, whereby a body of hot oil is floated upon the body of water, the tank having a gas chamber at its extreme upper end above the oil level, a preheating and cooling conductor extending horizontally across the upper end of the tank and having spaced preheating passages in close relation and segregated from the influent flowing through the conductor, the conductor being immersed in the upper transverse zone of the body of oil and occupying approximately the entire transverse area of said tank, whereby hot oil flowing upwardly after being washed in said body of water is divided and caused to flow in streams through the passages in the conductor, said conductor having an inlet for an emulsion influent and an outlet remote from said inlet, whereby the influent is caused to flow in an extended travel path between said passages so that it is heated and the upper zone of the oil body is cooled by heat exchange, a gas conduit extending from the upper side of the conductor to the gas chamber for conducting gas liberated in said conductor to said chamber, means for conducting the preheated influent to the bottom of the body of water, and means for discharging water from said tank.

10. A separator including, an upright cylindrical tank, a gas outlet in the top of the tank, a body of water in the tank, means in the lower end of the tank for heating said body of water, an oil outlet at the upper end of the tank maintaining an oil level near the top of the tank, whereby a body of hot oil is floated upon the body of water, the tank having a gas chamber at its extreme upper end above the oil level, a preheating and cooling influent conductor extending horizontally across the upper end of the tank and having spaced preheating passages in close relation and segregated from the influent flowing through the said conductor, the conductor being immersed in the upper transverse strata of the body of oil and occupying approximately the entire transverse area of said tank, whereby the entire flow of the influent is relatively through the upper strata of the body of oil, said conductor having an inlet for an emulsion influent and outlet remote from said inlet, whereby the influent is caused to flow in an extended travel path between said passages and the travel is prolonged in heat exchange relation within the upper strata of the body of oil to obtain maximum preheating and maximum cooling, means for conducting the preheated influent down through the body of oil, and means for discharging water from said tank.

JAY P. WALKER.